Oct. 10, 1967   B. CHANDLER   3,345,792
WOOD DECK STRUCTURE
Filed Aug. 30, 1965   4 Sheets-Sheet 2

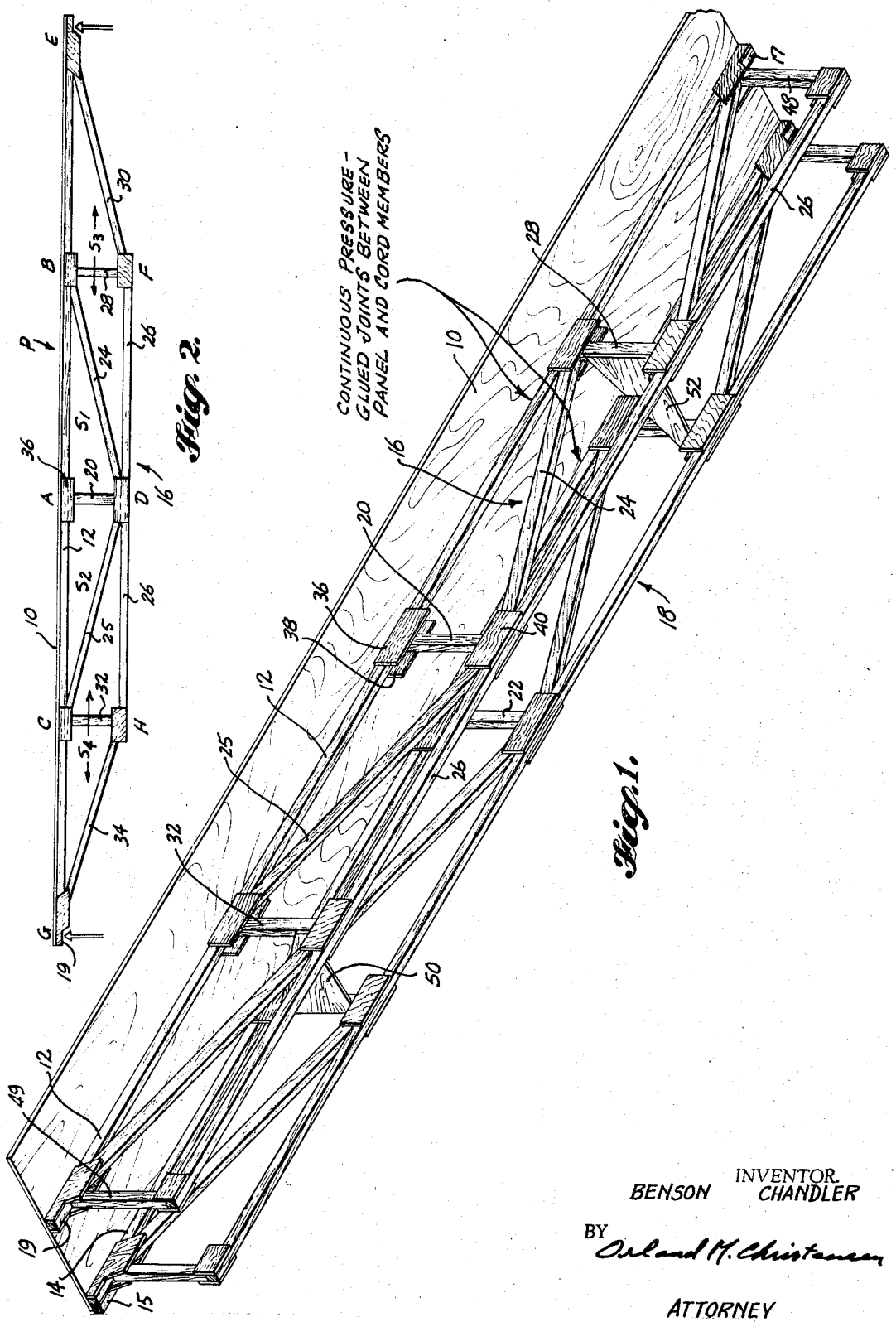

INVENTOR.
BENSON CHANDLER
BY
*Orland H. Christensen*
ATTORNEY

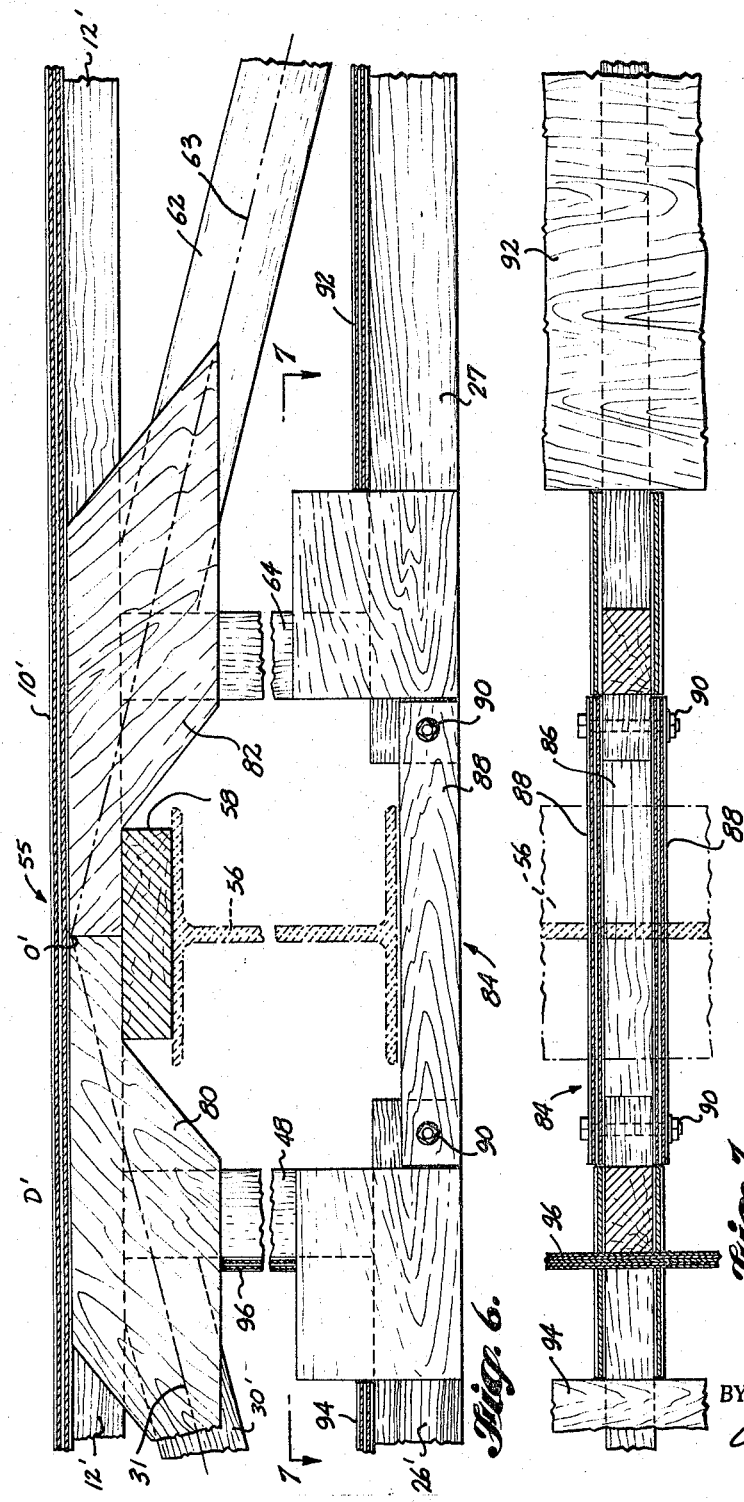
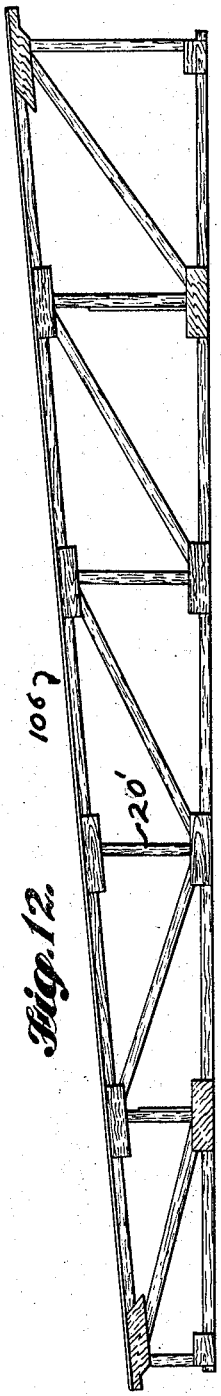

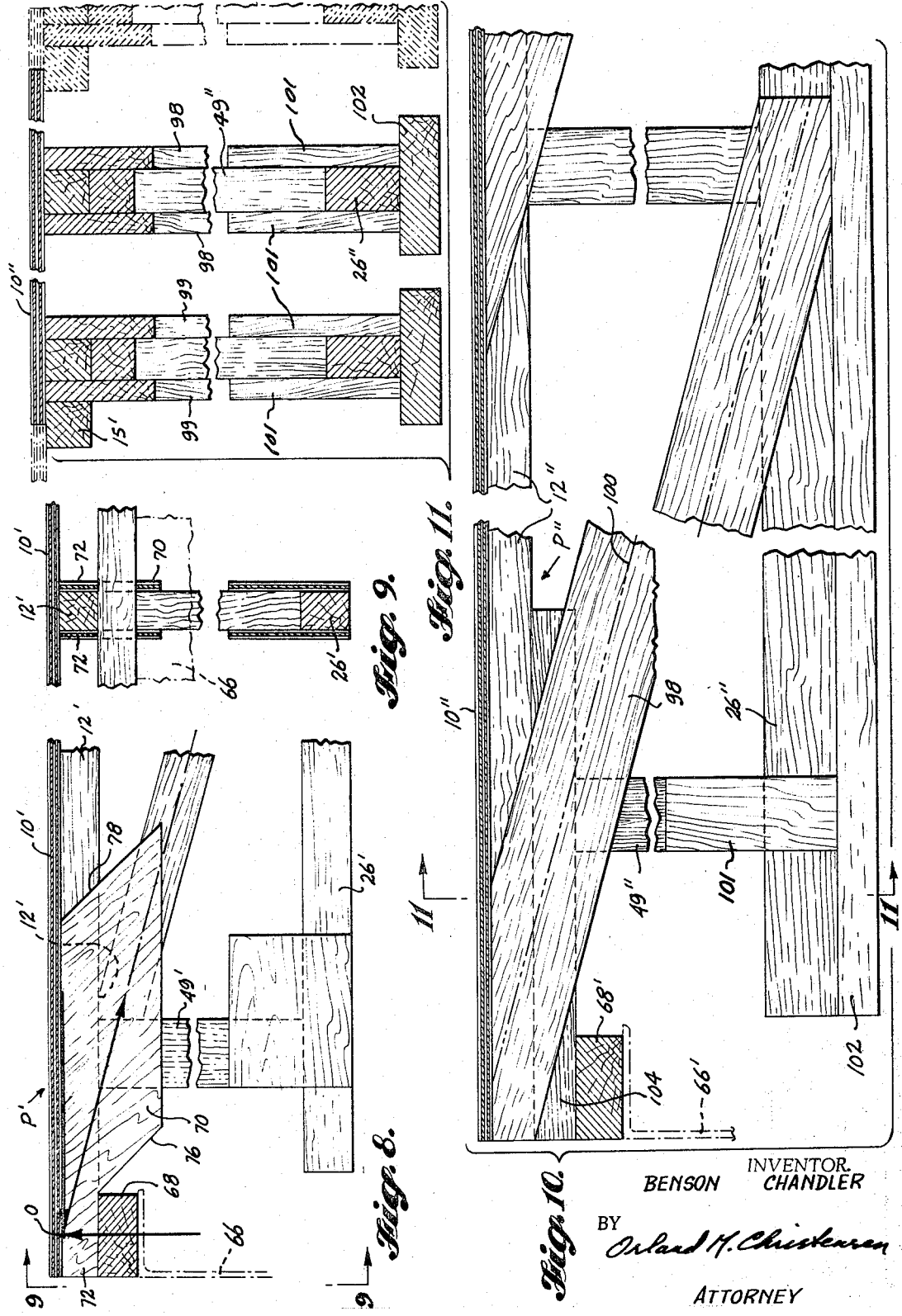

United States Patent Office 3,345,792
Patented Oct. 10, 1967

3,345,792
WOOD DECK STRUCTURE
Benson Chandler, Medina, Wash., assignor to Holdsworth & Company, Inc., Medina, Wash., a corporation of Washington
Filed Aug. 30, 1965, Ser. No. 483,577
10 Claims. (Cl. 52—648)

This invention relates to wood structures and more particularly to a wood deck structure utilizing the combination of an orthotropic plate or stressed-skin panel member and open-web trusses. While the invention is herein described in terms of particular preferred embodiments thereof, it will be recognized by those skilled in the art that certain changes and modifications may be made without departing from the essential features involved.

It is well known that wood has extremely high strength in compression and tension, being stronger by weight than steel, but that it is weak in response to shear forces which tend to split wood, and is weak in response to surface bearing forces or concentrated loads which tend to deform wood, because it is soft. Heretofore it has been difficult to take advantage of the extreme strength of wood in compression and tension, because of the nature of fasteners normally used to secure wood members together. That is, nails, pegs, staples, bolts, and all other kinds of penetrating fasteners used in wood construction subject the structure to the disadvantages of wood heretofore mentioned. Weaknesses in response to concentrated forces become apparent and severely limit the overall strength of the structure and the manner in which wood elements may be employed therein.

In recent years research has developed new resin glues and other cementing substances capable of bonding wood elements together with greater permanence and strength than standard penetrating fasteners. It is now possible to use glued joints entirely, when machinery is available on a proper scale to make glue construction economically feasible. The present invention takes advantage of these advances in the art by providing an improved deck structure utilizing the extremely high strength of a stressed-skin panel member or orthotropic plate as hereinafter defined, by coupling with it, in a manner which will become apparent presently, an open-web truss structure in a configuration enabling the use of extremely light wood members. The configuration renders the truss operable to transfer the load applied to the structure to the high-strength orthotropic plate member, while at the same time providing the stability and rigidity characteristic of much larger structures having much greater overall weight.

The term "orthotropic" is taken from the prefix "ortho-," meaning straight, and the combining form "-tropic," meaning turning, i.e. reacting, in a predetermined manner in response to a given type of stimulus or force. The term "orthotropic plate" as used herein means a substantially straight structure consisting of a continuous plywood panel and at least one continuous wood cord member joined thereto in a continuous joint along its length, the composite structure being adapted to react in a predetermined manner in response to vertical loads. As will be seen, the manner of reaction of the orthotropic plate, sometimes referred to as a stressed-skin panel, in combination with one or more of the coupled open-web trusses, is critical.

It is the main object of this invention to provide a low-cost, lightweight truss-panel structure for long-span roof and floor constructions. Floor and roof deck structures may be provided according to this invention which are capable of spanning distances of up to 100 feet or more with wood materials having a total weight of approximately 3 lbs. per square foot of deck area and carrying loads totaling 36 to 50 lbs. or more (including its own weight) per square foot of deck area. The exact dimensions of the structure may be designed, of course, according to the loads to be carried thereby.

Another object hereof is to provide a truss-panel span which eliminates the need for secondary structures such as rafters or joists normally required between supporting beams and the subflooring or underlayer of a roof, for example. In all flooring and roof structures an underlayer is a necessary element to provide a continuous bed upon which the surface flooring or roofing is laid. This invention incorporates the subflooring or subroofing panel or deck into the supporting structure itself for a more efficient use of materials, reduction in the amount of wood material needed, and hence reductions in costs, weight, labor, and construction time.

A related object is to provide such a deck span which has a higher strength-to-weight ratio than heretofore possible, thereby rendering it feasible to provide larger preconstructed modules according to the invention so that construction time and labor costs are reduced. Further, since larger elements can be preconstructed in the factory, strength is further increased inasmuch as advantage can be taken of high pressure gluing techniques heretofore mentioned, whereas these techniques cannot feasibly be utilized in the field.

Another object hereof is to provide long-span truss-panel elements which are adapted for reasonably convenient transportation and handling, yet are adapted when joined to other identical panels to form a substantially continuous deck diaphragm having high strength in all directions parallel to its surface for stability in response to loads applied in surface-parallel directions by wind and earthquake forces.

A further object of the invention is to provide a deck structure which utilizes standard dimension wood and plywood elements which are readily available in volume so that the structure is easily incorporated into building designs otherwise utilizing conventional construction elements and techniques.

Still another object of the invention is to provide a deck structure which is less subject to variations in elevation or camber due to changes in the moisture content of the atmosphere than previous panel or truss structures designed for similar purposes.

A still further object heretofore alluded to, is to provide a structure taking full advantage of the availability of high-temperature setting resin glues and other glues and adapted to utilize the full strength of wood elements by means of its all-glued preconstruction, with no requirement for penetrating fasteners in the weight-bearing joints thereof.

To achieve the above objects and others recognizable by those skilled in the art, the invention provides a deck structure comprising, in combination, a horizontal orthotropic plate consisting of a continuous elongated plywood panel and at least one continuous wood cord member glued thereto in a continuous joint along its length, and an open-web wood truss coupled with the cord member. The truss comprises a plurality of sections. Each section includes a single vertical post member which has its upper end portion glued to the aforementioned cord member, and a diagonal tension member having end portions glued respectively to the lower end of the post member and to the cord member at a point spaced from the post member so as to converge with the cord member substantially toward the nearer end thereof. The two sections nearest the center of the truss preferably have the post member thereof in common and have their diagonal members respectively converging with the cord member toward opposite ends thereof. Further, the truss includes support points for the structure on the cord member substantially coincident with the intersections therewith of diagonals of the endmost sections of the truss. When a vertical (downward) load is applied to the structure thus defined the load is translated into direct stress loading in the orthotropic plate itself, and particularly in the plywood panel. (Direct stress is understood in the art to mean tension or compression along the length of a structural member.) The latter aspect of the invention is the critical factor which permits the use of light materials to support relatively large loads. Virtually the entire vertical force applied to the structure by the load which it carries and by its own weight is translated by the configuration of the open-web truss into shear forces in the orthotropic plate, and primarily into compressive forces in the plywood panel portion thereof, which is capable of carrying extremely high compressive loads due to the continuous glue joint between it and the cord members. The panel and cord member associated with each truss form a T-beam colum in the truss to provide extremely high rigidity relative to the weight of the structure.

Other aspects of the invention reside in certain subsidiary features hereinafter described in greater detail.

For example, each support point preferably comprises that portion of the cord member which includes the point of intersection of the center line of the endmost diagonal with the longitudinal center of gravity of the orthotropic plate at the cord member.

When the truss includes more than two sections, which it normally does, the truss further includes a lower continuous wood cord member or tension member joined to the lower end of each of the post members and to the lower end of each of the diagonal members.

In one preferred form of the structure the cord and diagonal members in at least the endmost sections of the truss are of the same thickness transversely of the truss, which further includes at the intersection of the cord member with at least the endmost diagonals a pair of gusset plates glued to and overlapping the opposite outside faces of the cord and diagonal members to form the joints therebetween, respectively. These gusset plates further have respective elongated portions substantially coextensive with the cord member in the region of the support points and have vertical depths at least equal to that of the cord member. In addition, they include diagonally opposite extending portions overlapping the diagonal members whereby to transmit forces between the diagonal member and the support point. This subsidiary feature of the invention is an important one inasmuch as it defines more particularly the relationship between the endmost diagonal members and the support points portions of the orthotropic plate. It enables the support point structure to distribute the load forces from the support point to the open-web truss and hence back to the orthotropic plate, avoiding a concentration of bending stresses at the ends thereof and permitting lightweight support point construction.

The truss further preferably includes a pair of plywood gusset plates at each joint of the truss, those comprising the joints at the first-mentioned cord member having dimensions relative to the dimensions of the orthotropic plate whereby to impart thereto in regions of the joints a section modulus having a value substantially twice that of the orthotropic plate in other regions along the cord upper member.

According to another feature of the invention the deck span is constructed as previously defined including the lower cord member and with the continuous plywood panel consisting of a plurality of jointed plywood sheets, and wherein the structure includes at least two of the first-mentioned cord members and coupled wood trusses. In this embodiment one of the cord members is glued adjacent to the edge of the continuous plywood panel and an additional cord member is glued adjacent to it and overlapping the edge of the panel to form a flange to which the opposite edge of the next adjacent identical deck span may be secured. The additional flange-forming cord member is effect converts the panel-truss combination adjacent to it into a T-beam colum, whereas it otherwise would have acted as a weaker L-beam. Stabilizing means are normally secured transversely between the trusses to provide transverse stability therebetween.

In still another embodiment of the invention, the post and cord members are constructed of the same thickness transversely of the truss, such as two-inch lumber, and each of the diagonal members heretofore defined comprises a pair of relatively thin boards, such as one-inch lumber, having their end portions respectively glued to and overlapping the opposite outside faces of both the post and the cord members to form the joints therebetween.

Another feature calls for an additional vertical post member joined to the first-mentioned (upper) cord member adjacent to at least one of the support points, and a lower continuous wood cord member joined to the lower end of each of the post and diagonal members. Further, a cantilevered end section is provided extending beyond that support point and comprising an extension of the orthotropic plate and at least one open-web wood truss coupled thereto. The last-mentioned truss includes a terminal vertical post member having its upper end joined to the end of the upper cord member, a diagonal tension member having end portions joined respectively to the lower end of the terminal post member and to the cord member whereby its center line substantially intersects the support point, and a terminal lower cord member having one end coupled to the lower end of the terminal post member and to the last-mentioned diagonal member. The other end of the terminal lower cord member is adapted to be coupled to the end of the aforementioned additional post member on the main span, so that the cantilevered open-web truss section thus defined provides a support point for the end of the orthotropic plate. The plywood panel is thereby placed in compression in response to a distributed vertical load.

Other features, objects and advantages of the invention will become apparent from the following more detailed description taken in connection with the accompanying drawings.

FIGURE 1 is an isometric view taken from beneath a deck structure according to the invention and illustrating the configuration of one embodiment thereof wherein gusset plates are utilized in construction of the open-web truss coupled to the orthotropic plate or stressed-skin deck panel.

FIGURE 2 is a side view of a truss-panel span according to the invention, showing certain basic features thereof and illustrating the location of the support points.

FIGURE 6 is an enlarged, fragmented view of part of the truss structure of FIGURE 3 showing particularly the support point of the cantilevered end section, with a support beam shown in cross section.

FIGURE 7 is a sectional view taken on line 7—7 of FIGURE 6.

FIGURE 8 is an enlarged and partially fragmented view of gusset plate construction at a terminal support point.

FIGURE 9 is an end view, partially fragmented, taken on line 9—9 of FIGURE 8.

FIGURE 10 is a fragmented view of a portion of a truss constructed according to another embodiment of the invention.

FIGURE 11 is a sectional, partially fragmented, view taken on line 11—11 of FIGURE 10 and showing the relative positions of trusses and panel members when identical span modules according to the invention are secured alongside one another.

FIGURE 12 is a side view showing a pitched truss constructed according to the invention.

Figure 3:
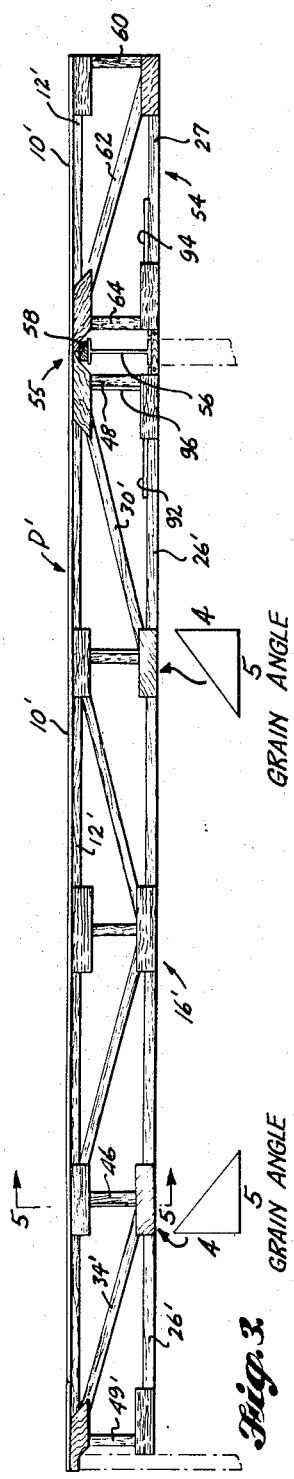
FIGURE 3 is a side view of a truss-panel structure according to the invention, illustrating a typical manner of support at each end and showing a cantilevered end section.

A preferred embodiment of the invention as illustrated in FIGURE 1 comprises the stressed-skin panel member or orthotropic plate P consisting of a continuous plywood panel 10 and first and second continuous wood cord members 12 and 14 joined thereto in continuous joints along their respective lengths, and open-web wood trusses 16 and 18 respectively coupled to said cord members. The plywood panel 10 typically consists of 4 x 8 foot sheets of ½-, ⅝-, or ¾-inch 5-ply fir plywood scarfed jointed end to end to form, in effect, a continuous length of plywood from one end of the structure to the other.

Scarf-jointing is well known in the wood construction art as meaning gluing together adjoining members whose edges are oppositely beveled at acute angles. (Finger-jointing may also be employed.) As mentioned before, high-temperature setting resin glues permit joining pieces of wood together in this manner so that in compression or tension they act as a continuous piece of wood in that the joint is virtually as strong as any other portion thereof.

The cord members 12 and 14 typically consist of 2 x 2's or 2 x 3's of conventional lengths scarf-jointed or finger-jointed to form continuous members equal in length to the plywood panel 10. Each is glued in a continuous joint along the bottom of the panel 10 in a suitable high-pressure glue-press machine large enough to handle components of the size involved. So-called "nail gluing" is not deemed adequate in strength for purposes of span-lengths made feasible by this invention. Typical lengths are twenty feet to one hundred feet or more in the case of roof spans and twenty to fifty feet or more in the case of floor spans.

The open web truss coupled to each cord member can best be described with reference to FIGURE 2 by considering first the two center sections $S_1$ and $S_2$ of truss 16 on either side of its center having in common the vertical post member 20. Sections $S_1$ and $S_2$ consist of the vertical post 20 which they have in common, joined to cord member 12 at point A, diagonal members 24 and 25 joined to the lower end of the post member 20 at D and to the cord member 12 at points B and C respectively spaced from the joint at A of post member 20 and cord member 12.

The basic structure of the invention, therefore, involves the two sections ABD and ACD. It is possible to support this much of the structure at points C and B to form a suitable span for short distances. When the span is long enough to require additional sections, as is usual, the truss then includes a lower wood cord member 26 which is continuous and interconnects the lower end of post member 20 and the lower ends of all of the other post members included in the additional sections. Thus the trapezoidal section $S_3$ at the right-hand end of the truss consists of the vertical post member 28 joined to the upper cord member 12 at B, a diagonal member 30 joined to post member 28 at F and to cord member 12 at E to converge with cord member 12 toward the right-hand support point, and portions of the continuous upper and lower cord members between points B and E and points D and F, respectively. Similarly, section $S_4$ at the left-hand end of the structure comprises post member 32, diagonal member 34, the portion of the lower cord member 26 between points H and D, and the portion of upper cord member 12 between points C and G.

Figure 4:
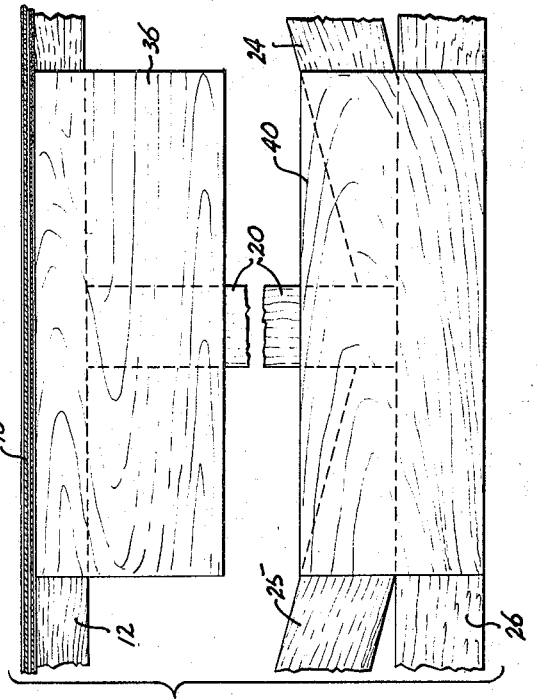
FIGURE 4 is an enlarged side view of typical gusset plate construction of joints between the two most centrally located sections of the truss structure.

According to one form of the invention each of the joints of two or more members in the truss includes a pair of gusset plates glued to and overlapping the opposite outside faces of the members joined, such as gusset plates 36 and 38 forming the joint between post member 20 and cord member 12, as can be seen in FIGURE 1. An enlarged view of this joint and the joint of the lower cord member 26 and diagonals 24 and 25 is shown in FIGURE 4.

In actual construction the trusses 16 and 18 would be preconstructed separately prior to gluing of the cord members 12 and 14 to the plywood panel 10. Briefly, the procedure involved consists of scarf-jointing the continuous cord members of the proper length, cutting the diagonal members of proper length at angles for butt-jointing at their ends against the cord and post members, respectively, cutting the post members to proper length, and positioning the truss members horizontally on a suitable platform for gluing. Pressure-gluing of trusses incorporating gusset plates at the joints is known, although the trusses involved here are unusually large and require large machinery for simultaneous gluing of all of the joints in a single truss. Thus the manner of construction of the trusses themselves is not deemed to require further explanation. The relative sizes of the gusset plates and truss members shown in FIGURE 4 are somewhat typical, although size and thickness may vary with strength requirements. At each joint the gusset plates must overlap opposite outside faces of each member sufficiently to effect the necessary transmittal of forces carried thereby, so gusset plate 36 overlaps cord member 12 and post member 20 sufficiently to form a rigid joint therebetween, and gusset plate 40 overlaps lower cord member 26, diagonals 24 and 25, and post member 20 to join them in a similarly rigid joint as shown.

Referring again to FIGURE 2, it will be appreciated that in response to a vertical load upon the structure the lower cord member 26 and diagonals 24, 25, 30 and 34 will be placed in tension, while the orthotropic plate D and post members 20, 28, and 32 will be placed in compression. Further, in response to loading between points A and B, for example, the orthotropic plate will experience tension below its center of gravity at any cross-section thereof and compressive stress above the center of gravity, these stresses being superimposed upon the overall compressive stress due to the overall load on the structure. In addition, it can be shown that the compressive stress in the orthotropic plate between points B and E is equal to the tensile stress in the lower cord member 26 between the points D and F. Since the long truss members, the lower cord members and the diagonals, are tension members, and in view of the extreme strength of wood in tension and the present capability of gluing techniques of joining members subject to tension, it is possible to use extremely light materials in the open-web truss. On the other hand, the orthotropic plate D acts as a T-beam column and is extremely stiff to compressive forces so as not to buckle, in spite of large bending moments applied by loads unevenly distributed over the panel 10. The post members are placed in compression, but are relatively short and thus stiff as columns, and they can be further strengthened in this respect by addition of transverse stabilizing web members 50 and 52 (FIGURE 1).

Figure 5:
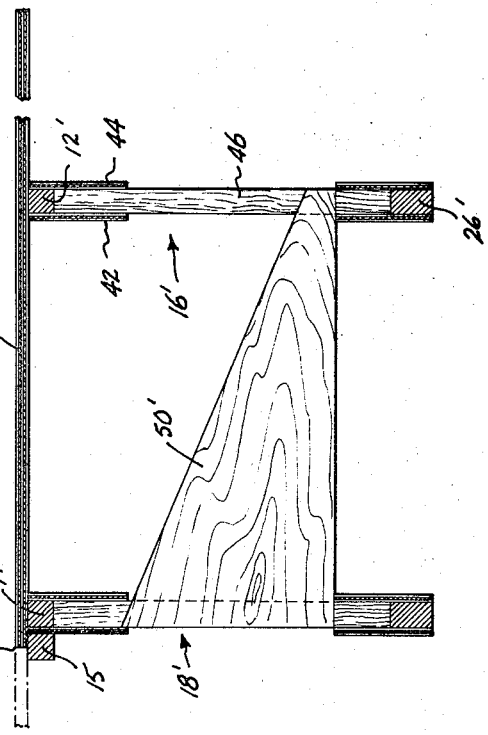
FIGURE 5 is a sectional view taken on line 5—5 of FIGURE 3.

As shown in FIGURE 5, such a web 50' is typically of generally triangular shape, its longer vertical edge stabilizing as a column the post member to which it is attached, while fixing the distance between the trusses by having its apex secured to the post member 46 as shown. The web members may be attached in any suitable manner, such as by nailing, since no substantial weight is carried thereby. Additional similar webs may be attached between post members of adjacent spans during construction in the field, in addition to the preconstruction of the webs between trusses of a single span, as shown in FIGURE 1. Such webs are typically placed at every other set of post members.

The combination of the orthotropic plate providing an extremely stiff T-beam column configuration and the relatively deep open-web truss of lightweight tension members with glued construction throughout to transmit efficiently all the forces experienced among the members, permits construction of long span modules of greater strength-to-weight ratios than heretofore possible. The T-beam configuration of the orthotropic plate is best appreciated by reference to FIGURE 5 showing a cross section of the preferred truss-panel construction. The T-beam column is formed by continuous plywood panel 10' and continuous cord member 12' glued thereto in a permanent continuous joint along their length. Further, when gusset plates 42 and 44 are considered, for example, along with the post member 46 which they join to the cord member 12', it is seen that the entire truss 16' and plywood panel 10' form a large T-beam extending the full length of the span. Truss 16' is approximately centered on panel 10', whereas the cord member 14' and truss 18' coupled thereto are joined to the panel near the left-hand edge 11 thereof. An auxiliary cord member 15 is glued adjacent to the cord member 14 and overlaps edge 11 to form a flange to which the plywood panel of the next adjacent span may be secured as shown. It is important to note that auxiliary cord member 15 converts the combination of plywood panel 10' and truss 18' into a T-beam structure, whereas without the extra cord member it would have more closely resembled a somewhat weaker L-beam configuration.

The lower cord member 26 of truss 16 in FIGURE 1 extends beyond post members 28 and 32, and additional post members 48 and 49 are joined by gusset plate joints to the upper cord member adjacent to the support points 17 and 19, respectively. These portions of the truss, which can be referred to as hangers, provide no particular strength advantage in the truss, unless the span is supported at the lower ends of post members 48 and 49 and corresponding post members of the truss 18, but are generally provided to facilitate the construction of a ceiling on the under side of the span.

The lower cord member extensions or hangers are further utilized in the embodiment illustrated in FIGURE 3, wherein a cantilevered end section 54 is shown. The right-hand end of the span is supported at 55 on an I-beam 56 upon which rests a nailer 58, typically a 2 x 6, to which a number of spans may be nailed. The cantilevered end section 54 comprises an extension of the orthotropic plate P' including the plywood panel 10' and the cord member 12' of each truss involved, and an open-web truss section. The truss section consists of a terminal post member 60, a diagonal member 62 joined to the lower end of the post member 60 and to cord member 12' adjacent to support point 55, and a lower cord member 27 having one end joined to post member 60 and diagonal member 62. Its other end is adapted to be coupled to the end of the lower cord member 26' of the main span in a manner to be described presently. The end section preferably also includes an additional post member 64 to which the lower cord member 27 is joined extending vertically from the joinder of diagonal member 62 with cord member 12'.

The lower cord member 27 of the end section is coupled to cord member 26' of the main span by means of a coupling member 84 consisting of a compression interlayer member 86 (FIGURE 7) and a pair of wood plates or straps 88 of plywood of any suitable thickness. Compression member 86 is cut to the required length to be abutted between the ends of cord members 26' and 27. Strap members 88 are longer to overlap the opposite faces of the cord members and are bolted thereto by bolts 90 so that the coupling member is easily removed at the construction site and replaced after the span and end section are lowered onto the supporting beam 56.

Since the end portion of cord member 26' and cord member 27 are compression members, these cord members normally require stiffening diaphragms 92 and 94 located as shown in FIGURES 3, 6 and 7. A vertical diaphragm 96 may also be provided on one or both of the pairs of post member 48 and 64.

The cantilevered end section permits extending the orthotropic plate beyond a support point so that its high resistance to bending moment and the efficiency of the basic structure according to the invention may be further utilized when cantilevered construction is required. The details of the gusset plate construction at cantilevered support point 55 shown in FIGURES 6 and 7 will be described following an explanation of the functional shape of support point gusset plates in connection with the end-support shown in FIGURE 8.

At the left-hand end support point shown in FIGURES 3, 8 and 9 the steel beam 66 supports a 2 x 4 nailer 68 upon which the span is carried. In a typical orthotropic plate P' constructed of ⅝ inch plywood with 2 x 2 cord-members on 24-inch centers, the center of gravity or area of any section of the plate occurs at approximately the lower face of the plywood panel 10'. In order for the bending stresses in the orthotropic plate P' at the support point O to be minimal, the forces at point O must be transmitted to the open-web truss by means of the diagonal member 34'. To meet this requirement the diagonal is positioned to have its center line 35 intersect the center of gravity, that is, the lower face of plywood panel 10', within a region directly above some portion of the nailer 68, preferably directly above its center at point O or beyond toward the end of the cord member. When so constructed, the forces applied at point O are in directions and of relative magnitudes substantially as shown by the heavy black arrows.

To effect the necessary distribution of forces from support point O to the truss and hence to the overall panel-truss structure, special construction is provided for gusset plates 70 forming the support point joint of diagonal member 34' and cord member 12'. Gusset plate 70 includes an elongated portion 72, coextensive with the end of cord member 12' over the nailer 68 and having a depth vertically at least equal to the depth of the cord member. At its opposite end each gusset plate has another extending portion or corner 74 overlapping diagonal 34' substantially to complete the rigid joint between diagonal member 34 and that portion of cord member 12' above the nailer 68.

The exact shape of the gusset plates 70 is optional within the limits of the required features described above. Angled edges 76 and 78 may be cut at right angles to the length of the truss. In this case the angles result from the fact that the gusset plates are cut from a standard sheet of plywood on an angle whereby to impart the greatest strength possible to the orthotropic plate in the end portion. It is well known that plywood is strong in tension when subjected to direct stress in the direction of or at right angles to the grain of the outer veneers, and relatively weak when subjected to tension or compression forces at a 45 degree angle to the grain.

Considerable research has been done in the past to determine optimum grain angles for plywood in different uses, including gusset plate construction of trusses. As a general rule in the context of the present invention, the optimum grain angle for those gusset plates coupling the truss to the cord members of the orthotropic plate, such as cord member 12', depends upon the dimensions of cord member 12' and the thickness of the gusset plate to be applied, which is usually ⅜ of an inch. The optimum grain angle for the illustrated structure, according to the invention, is the angle resulting from the ratio of four vertical units to five horizontal units, as illustrated in the diagrams accompanying FIGURE 3. Accordingly, the gusset plates at the support points are applied at a 4-to-5 slope as shown and for greatest convenience are cut from standard sheets along corresponding diagonal lines resulting in the angled edge 78. The opposite angled edge 76 is cut parallel to edge 78 as a matter of convenience, and this angle assists in a positioning of the structure during construction of a building. FIGURES 1, 2, 3, and 12 show that gusset plates preferably are applied with angled grain at each joint involving one of the endmost diagonals, since these diagonals apply to the gusset plates greater amounts of force than are applied to gusset plates at other joints.

Further, the gusset plates forming joints at the upper cord members are of a size to double the section modulus of the orthotropic plate at those points in order to compensate for the increased bending moment experienced by the orthotropic plate at these joints. In the absence of a reason for angling the grain, as at the support points, it is made horizontal, since the gusset plates are best adapted to impart the increased section modulus to the orthotropic plate when the grain thereof is arranged at a right angle to the vertical forces applied.

Gusset plates 80 and 82 at the cantilever support point 55 (FIGURES 3, 6 and 7) are of similar shape to that just described. One difference to be noted, however, is that diagonal members 30' and 62 are positioned with respect to cord member 12' and post members 48 and 64, respectively, whereby their respective center lines 31 and 63 intersect the center of gravity of the orthotropic plate P' at the same point O' which corresponds to the vertical center line of the nailer 58 and support beam 56, rather than at points spaced from the ends of the gusset plate as in FIGURE 8. This feature is preferred in order to reduce the bending moment stress at the support point 55 and to avoid necessity for auxiliary strengthening elements in the orthotropic plate at this point.

While the truss-panel structure according to the invention has been described heretofore primarily in terms of gusset plate construction, the invention is not limited to that form. The embodiment illustrated in FIGURES 10 and 11 utilizes pairs of diagonal members 98 and 99 consisting of relatively flat boards glued to and overlapping the outside faces of adjoining cord and post members to form the joints therebetween without necessity for additional wood members, such as gusset plates, except at those joints not involving diagonal members. Plates 101 of the same thickness as the diagonals are employed at the end hanger joint as shown. As in the construction described in connection with FIGURE 8, the center line 100 of diagonal member 98 in FIGURE 10 intersects the center of gravity of the orthotropic plate P'' which again is taken as occurring at the lower face of the plywood member 10'', at a position directly above the nailer 68' supported by the steel angle iron 66'. Again, this construction effects the necessary transfer of forces from the support point to the open-web truss to avoid excessive bending moment stresses at the end of the orthotropic plate. The shoe 104 is provided when extra-heavy loads are anticipated.

It is seen in FIGURE 11 that the construction of this embodiment is well adapted to the same positioning of trusses across the width of the panel member 10'' wherein the right-hand truss is positioned substantially centrally of the panel 10'' and the left-hand truss is positioned near the left edge thereof with an auxiliary cord member 15' glued to the panel member 10'' along its edge to form a flange for and adjacent panel. Again the auxiliary cord member converts the L-beam configuration formed by the left-hand truss and the panel into a stronger T-beam configuration.

Also illustrated in FIGURES 10 and 11 is the provision of a flange member 102 which is glued in a continuous joint along its length to the lower cord member 26'' and having a width transversely of the truss greater than the thickness of the cord member 26''. This flange member converts the T-beam truss-panel structure into an I-beam configuration for still greater strength and rigidity. In addition, the flange member provides a convenient nailer for ceiling structure below the span. When heavier construction required occasions the use of the flange member 102, it is desirable to include the additional shoe 104 glued to the underface of the cord member 12'' at the end of the orthotropic plate and preferably extending at least beyond the first post member 49''. This embodiment of the invention provides a great increase in rigidity and strength of the structure for floor joist construction, for example. Of course the I-beam configuration of the invention is not limited to that wherein the dual diagonal members 98 are utilized, since it is equally feasible to include the flange member 102 when gusset-plate construction is employed.

The sloped-truss span 106 shown in FIGURE 12 illustrates that the invention is not limited to a construction wherein all of the post members are of the same length and upper and lower cord members parallel. Clearly, the basic features of the invention are adaptable to trusses of a variety of different shapes where long-span construction is needed and open-web truss construction is desired. In fact, it is common in roof construction to vary the post lengths along the length of the truss in order to provide a camber for drainage and, incidentally, for slightly increased strength.

Another aspect of the invention illustrated in FIGURE 12 is the fact that the two centermost sections having the post member 20' in common need not necessarily be located at the geometric center of the span, but may be offset as shown.

Thus, the invention provides a low-cost long-span deck structure construction having greater strength-to-weight ratio than heretofore possible and including the convenient feature that the various utilities can be easily installed through the open-web truss construction. Many floor and roof deck structures involve box beam or laminated beam construction which prohibit the installation of electrical wiring, air conditioning and heating ducts, plumbng, etc., and necessitate their installation where visible rather than hidden as is possible with the present invention. Further, the increased depth of the deck structure according to this invention provides a rigidity which cannot be obtained with heavier, more shallow continuous beam structures with similar weight and load specifications. For the same weight and cost of material, spans can be constructed approximately three times the length of ordinary carpentry, whereas normally the cost of clear span construction increases roughly as square of the length of the span.

Another advantage of the invention is the ease with which the structure may be fireproofed. Fireproofing treatment of wood is possible, so long as the structural elements are small. The elements of the present structure can be fire-treated prior to construction for approximately $0.15 per square foot of deck area of final construction.

These and other advantages of the invention will be recognized by those skilled in the art.

I claim as my invention:

1. A deck structure comprising in combination a horizontal orthotropic plate consisting of a continuous elongated plywood panel and at least one continuous wood cord member glued thereto in a continuous joint along its length, and an open-web wood truss coupled with said cord member, said truss comprising a plurality of sections each including a single vertical post member, said post member having its upper end portion glued to said cord member, and further including a diagonal tension member having end portions glued respectively to the lower end of said post member and to said cord member at a point spaced from said post member to converge with said cord member substantially toward the nearer end thereof, the two sections nearest the center of said truss having said post member in common and having their diagonal members respectively converging with said cord member toward opposite ends of the structure, said truss having support points for said structure on said cord member substantially coincident with the intersections of the center lines of the endmost diagonals with the orthotropic plate, whereby a vertical load imposed on said structure is translated into direct stress loading in said orthotropic plate in the direction of its length.

2. The deck structure defined in claim 1 wherein said post members are of the same thickness as the cord members transversely of the truss and abut said cord members at the joints between said cord and post members, and wherein each of said diagonal members comprises a pair of relatively thin boards having first end portions respectively glued to and overlapping the opposite outside faces of said post and cord members to form the joints therebetween and having their other end portions respectively glued to and overlapping the opposite outside faces of said core member at their joinder therewith.

3. The deck structure defined in claim 1 wherein each support point comprises a portion of said cord member including the point of intersection of the center line of said endmost diagonal with the longitudinal center of gravity of the orthotropic plate at said cord member.

4. The deck structure defined in claim 3 wherein the diagonal and cord members of at least the endmost sections of the truss have the same thickness transversely of the truss, and wherein the truss further includes at each intersection of said cord member with the endmost diagonal member a pair of plywood gusset plates glued to and overlapping the opposite outside faces of said members and each having an elongated portion substantially coextensive with said cord member at said support point, said elongated portions being of vertical depth at least equal to said cord member, said gusset plates further having diagonally opposite corner portions overlapping said diagonal members, respectively, whereby to transmit forces between said diagonal members and said support point.

5. The deck structure defined in claim 4 wherein said truss includes at each of the joints of the members of said truss a pair of plywood gusset plates glued to and overlapping the opposite outside faces of said members, and wherein the pair of gusset plates at each joint of the first-mentioned cord member with other members of the truss comprises a pair of plywood plates of dimensions relative to the dimensions of the orthotropic plate whereby to impart thereto in regions of said joints a section modulus having a value substantially twice the section modulus of said orthotropic plate in other regions along said cord member.

6. The deck structure defined in claim 1 wherein said truss further includes a lower continuous wood cord member glued to the lower end of each of said post members and to the lower end of each of said diagonal members.

7. The deck structure defined in claim 6 wherein said continuous plywood panel consists of a plurality of scarf-jointed plywood sheets and wherein said structure includes at least two of said cord members and coupled wood trusses, one of said cord members being glued adjacent to one edge of said plywood panel, and additional cord member glued along the edge of said panel adjacent to the last-mentioned cord member and overlapping said edge to form a flange to which the opposite edge of another substantially identical deck structure may be secured, and stabilizing means secured transversely between said trusses.

8. The deck structure defined in claim 6 wherein said truss further includes an elongated continuous wood flange member having its upper side glued to said lower cord member in a continuous joint along its length and having a width transversely of truss greater than the transverse thickness of the lower cord member.

9. The deck structure defined in claim 1 wherein said truss further includes an additional vertical post member glued to said cord member adjacent to at least one of said support points, and a lower continuous wood cord member glued to the lower end of each of the post and diagonal members, said structure further including a cantilevered end section extending beyond one of said support points, said end section comprising an extension of said orthotropic plate and an open-web wood truss coupled with a cord member included in said extension, said truss including a terminal vertical post member having its upper end portion glued to the end portion of the first-mentioned cord member, a diagonal tension member having end portions glued respectively to the lower end of the terminal post member and to the first-mentioned cord member whereby its center line substantially intersects said support point and a terminal lower cord member having one end portion coupled to the lower ends of said terminal post member and of the last-mentioned diagonal member, the other end of said terminal lower cord member being adapted to be coupled to the lower end of said additional vertical post member.

10. A deck structure comprising in combination a horizontal orthotropic plate consisting of a continuous elongated plywood panel and at least one continuous wood upper cord member glued thereto in a continuous joint along its length, and an open-web wood truss coupled with said upper cord member, said truss comprising a plurality of sections each including a single vertical post member, said post member having its upper end portion joined to said upper cord member, a diagonal tension member having end portions joined respectively to the lower end portion of said post member and to said upper cord member at a point spaced from said post member to converge with said upper cord member substantially toward the nearer end thereof, a continuous lower cord member interconnecting the lower ends of said post and diagonal members, vertical end post members joined to said upper cord member adjacent to the point of joinder therewith of diagonals of the endmost sections and having lower portions thereof joined to said lower cord member, the two sections nearest the center of said truss having said post member in common and having their diagonal members respectively converging with said cord member toward opposite ends thereof, and wood plate means integral with said diagonal members glued to and overlapping opposite faces of each of the cord and post members at the joinder locations therebetween to form glued joints at such locations, said truss having support points for said structure on said cord members substantially coincident with the respective intersections of the center lines of the endmost diagonal members with the center of gravity of the orthotropic plate, whereby stresses in said structure in response to vertical loads thereon are represented in direct stress loading in said orthotropic plate in the direction of its length.

References Cited

UNITED STATES PATENTS

| | | | |
|---|---|---|---|
| 702,332 | 6/1902 | Samen | 52—691 |
| 1,806,639 | 5/1931 | Moltzan | 52—693 |
| 1,949,818 | 3/1934 | Tarbox | 52—695 X |
| 2,365,579 | 12/1944 | Mulligan | 52—639 X |
| 2,520,333 | 8/1950 | Pedersen | 52—642 |
| 2,558,946 | 7/1951 | Fromson | 52—335 |
| 2,860,743 | 11/1958 | Cliff | 52—693 X |
| 3,067,544 | 12/1962 | Willatts | 52—691 X |
| 3,091,313 | 5/1963 | Colbath | 52—648 |
| 3,156,018 | 11/1964 | Slayter | 52—403 X |
| 3,170,198 | 2/1965 | Snider | 52—642 X |

DAVID J. WILLIAMOWSKY, *Primary Examiner.*

D. L. TAYLOR, *Assistant Examiner.*